(12) United States Patent
Wada

(10) Patent No.: US 7,711,470 B2
(45) Date of Patent: May 4, 2010

(54) CONTROL APPARATUS

(75) Inventor: Minoru Wada, Obu (JP)

(73) Assignee: DENSO CORPORATION, Kariya (JP)

( * ) Notice: Subject to any disclaimer, the term of this patent is extended or adjusted under 35 U.S.C. 154(b) by 116 days.

(21) Appl. No.: 12/185,266

(22) Filed: Aug. 4, 2008

(65) Prior Publication Data

US 2009/0070000 A1 Mar. 12, 2009

(30) Foreign Application Priority Data

Sep. 6, 2007 (JP) ............................. 2007-232096

(51) Int. Cl.
*G06F 19/00* (2006.01)
*F01L 1/34* (2006.01)
(52) U.S. Cl. .................. 701/102; 123/90.11; 123/90.15
(58) Field of Classification Search .............. 123/90.11, 123/90.15, 90.19, 568.16; 701/102; 73/118.2
See application file for complete search history.

(56) References Cited

U.S. PATENT DOCUMENTS 6,260,524 B1 * 7/2001 Wachi ...................... 123/90.15
6,917,874 B2 * 7/2005 Uchida et al. ................ 701/108
7,000,578 B2 * 2/2006 Eiraku ...................... 123/90.15
2005/0098127 A1 * 5/2005 Eiraku ...................... 123/90.15
2006/0075981 A1 * 4/2006 Iwase et al. .............. 123/90.15

FOREIGN PATENT DOCUMENTS

JP 10-220619 8/1998

* cited by examiner

*Primary Examiner*—Mahmoud Gimie
(74) *Attorney, Agent, or Firm*—Nixon & Vanderhye PC

(57) ABSTRACT

When a variable valve lift control apparatus is in a steady condition, a fluctuation control is performed. In the fluctuation control, a target lift amount is increased by a fluctuation width during an up-time and then the target lift amount is decreased by the fluctuation width during a down-time which is longer than the up-time to be returned to an original value. A decreasing amount of the integral term is greater than the increasing amount thereof. Consequently, the integral term can be made smaller than the original value. Even when a control duty is a larger value due to a hysteresis, the fluctuation control gradually decreases the increment of the integral term and converges the control duty to the small value.

6 Claims, 5 Drawing Sheets

CONTROL APPARATUS

CROSS-REFERENCE TO RELATED APPLICATION

This application is based on Japanese Patent Application No. 2007-232096 filed on Sep. 6, 2007, the disclosure of which is incorporated herein by reference.

FIELD OF THE INVENTION

The present invention relates to a control apparatus which controls a control input of a control object in such a manner that a control output of the control object agrees with a target value by a control using at least an integral term.

BACKGROUND OF THE INVENTION

An internal combustion engine for a vehicle is provided with a variable valve control apparatus which adjusts valve characteristic (valve timing, valve lift amount, working angle and the like) of an intake valve and an exhaust valve in order to improve its output and fuel economy and to reduce emission. In a system provided with a variable valve lift control apparatus driven by an electric motor, the control duty (current value) of the electric motor is controlled by PI control or PID control in such a manner that an actual lift amount agrees with a target lift amount.

JP-10-220619A shows an EGR control system in which a motor-driven EGR valve is feedback controlled by PID control in order to adjust an EGR amount. When a difference between a target opening/closing position and an actual opening/closing position of the EGR valve is within a permissible range, the I-gain (integral gain) is cleared to avoid an integration of a steady-state deviation due to the I-action (integral control action) so that an opening/closing vibration of the EGR valve is restricted.

As shown in FIG. 2, in the variable valve lift control apparatus of the motor drive type, a hysteresis characteristic may arise in the relationship between a control duty and a lift amount according to reaction forces which are received from the cam driving the intake valve. Due to this hysteresis characteristic, the control duty with respect to the same lift amount is varied between a case that the lift amount is increasing and a case that the lift amount is decreasing. Even when the variable valve lift control apparatus is in a steady condition, that is, even when the lift amount is maintained at a constant value, the control duty is a large value or a small value according to a prior control direction of the lift amount. When the control duty is the large value, more energy is consumed than a case where the control duty is a small value.

Generally, when calculating control duty by the PI control or the PID control, the difference of the control duty due to the hysteresis characteristic is adjusted mainly by the I-action (integral control action) which generates an output proportional to an integrated value of the difference between the target lift amount and the actual lift amount. Therefore, an increment of I-term (integral term) is equivalent to an increment of the control duty due to the hysteresis characteristic.

Even if the increment in the I-term is restricted by clearing the I-gain to avoid the integration of a difference by the I-action in a situation where the difference between the target lift amount and the actual lift amount is within the permissible range, only a further increment in I-term is restricted after the valve lift amount is maintained at the constant value. The increment in I-term until the valve lift amount becomes constant still remains. Hence, when the control duty is a large value due to the hysteresis characteristic, the control duty of large value is continued, which increases the energy consumption.

SUMMARY OF THE INVENTION

The present invention is made in view of the above matters, and it is an object of the present invention to provide a control apparatus capable of reducing energy consumption when a control object is in a steady condition.

According to the present invention, a control apparatus includes a determination means for determining whether the control object is in a steady condition, and a fluctuation control means for periodically repeatedly performing a fluctuation control. In the fluctuation control, when the control object is in the steady condition, a target value is varied in a specified direction by a specified width during a first time period and then the target value is varied in a reverse direction relative to the specified direction by the specified width during a second time period which is longer than the first time period to be returned to an original value.

In the fluctuation control, the target value is increased by the specified width and then is decreased by the specified width W to the original value, so that the integral term (an absolute value of the integral term in a case of a negative value) can be increased once and then decreased. The time period in which the target value is increased is longer than the time period in which the target value is decreased, whereby a decreasing amount of the integral term is greater than the increasing amount thereof. Consequently, the integral term can be made smaller than the original value. By periodically performing the above process repeatedly, while the target amount is increased and decreased around the original value, the integral term is gradually decreased.

Therefore, even when the control object is in a steady condition and the control input is a larger value due to the hysteresis, the fluctuation control gradually decreases the increment of the integral term and converges the control input to the smaller value, whereby the energy consumption can be reduced.

Since the control output of the control object can be appropriately increased and decreased by the fluctuation control, it can be avoided that a movable portion of the control object is always used at the same portion, whereby uneven abrasion at the movable portion can be restricted. Furthermore, since the control input can be converged to the small value where the energy consumption is small, magnetic noise generated by an actuator, such as a DC motor, of the control object can be reduced.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

An embodiment of the present invention will be described hereinafter.

Figure 1:
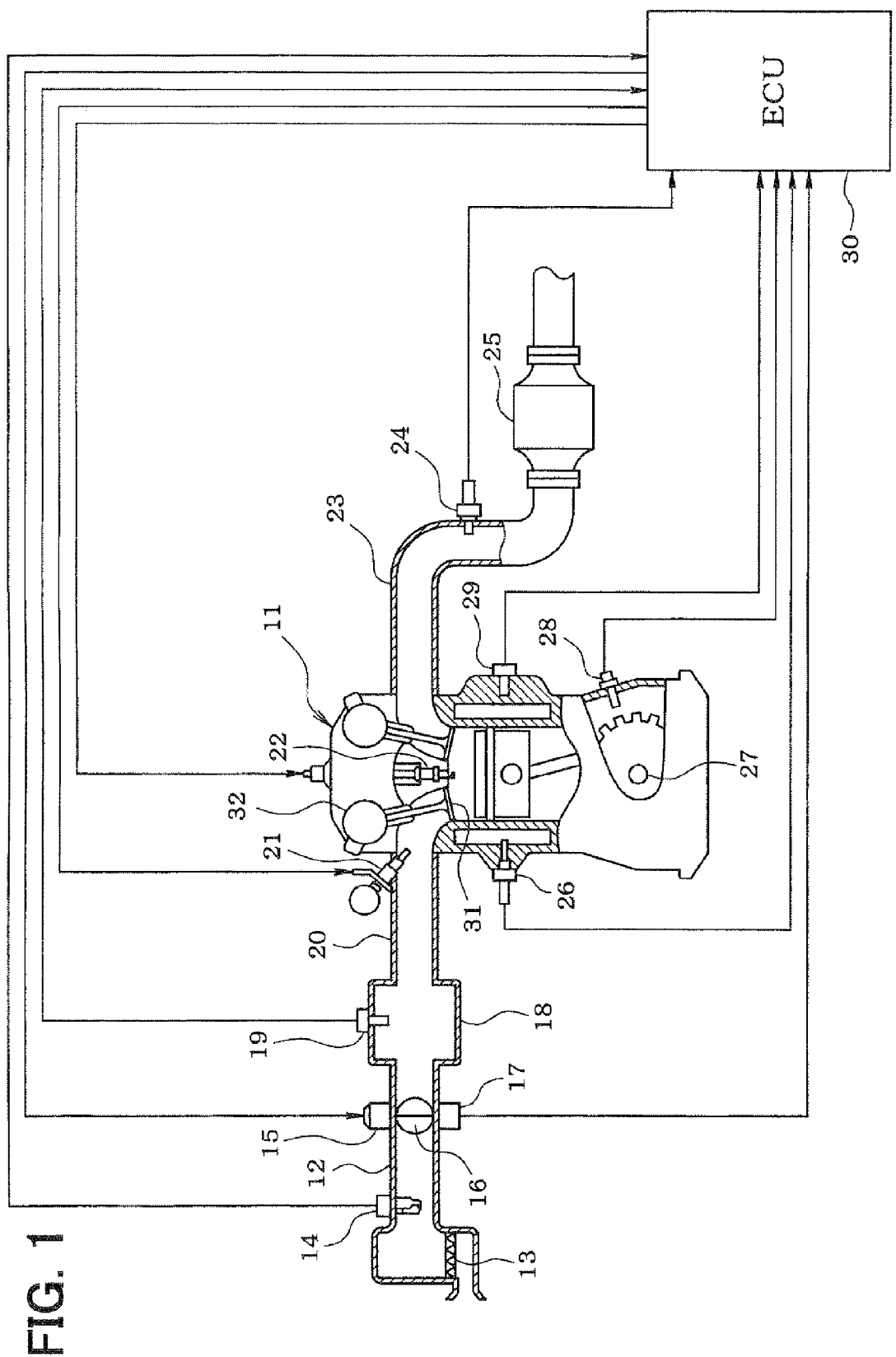
FIG. 1 is a schematic view of an engine control system according to an embodiment of the present invention.

Referring to FIG. 1, an engine control system is explained. An air cleaner 13 is arranged upstream of an intake pipe 12 of an internal combustion engine 11. An airflow meter 14 detecting an intake air flow rate is provided downstream of the air cleaner 13. A throttle valve 16 driven by a DC-motor 15 and a throttle position sensor 17 detecting a throttle position (throttle opening degree) are provided downstream of the air flow meter 14.

A surge tank 18 including an intake air pressure sensor 19 is provided downstream of the throttle valve 16. The intake air pressure sensor 19 detects intake air pressure. An intake manifold 20 which introduces air into each cylinder of the engine 11 is provided downstream of the intake pipe 12, and the fuel injector 21 which injects the fuel is provided at a vicinity of an intake port of the intake manifold 20 of each cylinder. A spark plug 22 is mounted on a cylinder head of the engine 11 corresponding to each cylinder to ignite air-fuel mixture in each cylinder.

Moreover, the engine 11 is provided with a variable valve lift control apparatus (control object) 32 which is driven by an electric motor to adjust a lift amount of the intake valve 31. An exhaust gas sensor (an air fuel ratio sensor, an oxygen sensor) 24 which detects an air-fuel ratio of the exhaust gas is respectively provided in each exhaust pipe 23, and a three-way catalyst 25 which purifies the exhaust gas is provided downstream of the exhaust gas sensor 24.

A coolant temperature sensor 26 detecting a coolant temperature and a knock sensor 29 detecting knocking of the engine are disposed on a cylinder block of the engine 11. A crank angle sensor 28 is installed on a cylinder block to output crank angle pulses when a crank shaft 27 rotates a predetermined angle. Based on this crank angle pulses, a crank angle and an engine speed are detected.

The outputs of the sensors are inputted to an electronic control unit (ECU) 30. The ECU 30 includes a microcomputer which executes an engine control program stored in a Read Only Memory (ROM) to control a fuel injection quantity of a fuel injector 21 and an ignition timing of a spark plug 22 according to an engine running condition.

The ECU 30 performs a variable valve lift control routine (not shown). That is, an actual lift amount of the intake valve 31 is detected and a target lift amount of the intake valve 31 is detected based on the engine operation condition and the like. Feedback control which includes I-term (integral term), such as PI control and PID control, is performed so that the actual lift amount of the intake valve 31 may consist with the target lift amount. A control duty (current value) of the motor (not shown) of the variable valve lift control apparatus 32 is controlled in order to feedback control the actual lift amount of the variable valve lift control apparatus 32.

In a case of the system in which a working angle is changed while changing the lift amount, an actual working angle is detected as substitution information of the actual lift amount, and a target working angle as substitution information of the target lift amount may be computed.

For example, in a case of the PI control, the control duty is computed by a following formula.

Control Duty=($P$-term+$I$-term+offset-term)×Duty Conversion Coefficient×Voltage Correction wherein P-term (proportional term) is proportional to a difference between the target lift amount and the actual lift amount, and I-term (integral term) is a term which is obtained by integrating the difference between the target lift amount and the actual lift amount with time.

Figure 2:
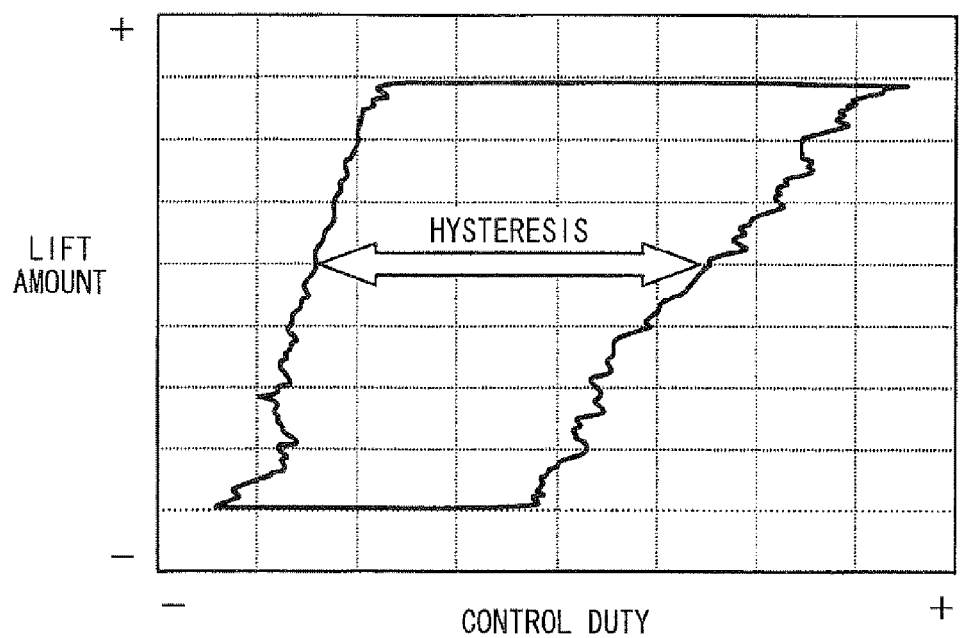
FIG. 2 is a graph showing a relationship between a control duty and a lift amount of a variable valve lift control apparatus.

In the variable valve lift control apparatus 32 of the motor drive type, as shown in FIG. 2, a hysteresis characteristic may arise in the relationship between the control duty and the lift amount according to reaction forces which are received from the cam driving the intake valve 31. Due to this hysteresis characteristic, the control duty with respect to the same lift amount is varied between a case that the lift amount is increasing and a case that the lift amount is decreasing. Even when the variable valve lift control apparatus 32 is in a steady condition, that is, even when the lift amount is maintained at a constant value, the control duty is a large value or a small value according to a prior control direction of the lift amount. When the control duty is the large value, more energy is consumed than a case where the control duty is a small value.

Generally, when calculating control duty by the PI control or the PID control, the difference of the control duty due to the hysteresis characteristic is adjusted mainly by the I-action (integral control action) which generates an output proportional to an integrated value of the difference between the target lift amount and the actual lift amount. An increment of I-term (integral term) is equivalent to an increment of the control duty due to the hysteresis characteristic.

Figure 3:
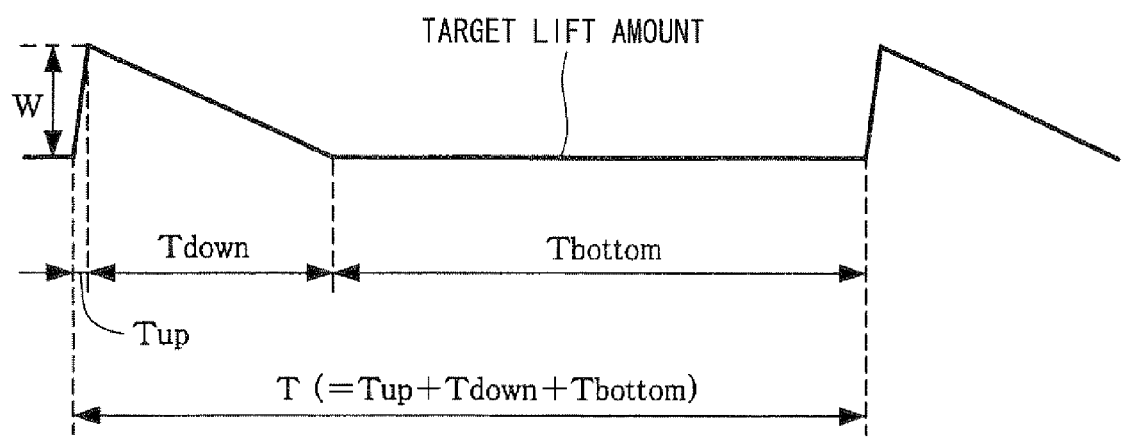
FIG. 3 is a time chart for explaining a fluctuation control.
Figure 5:
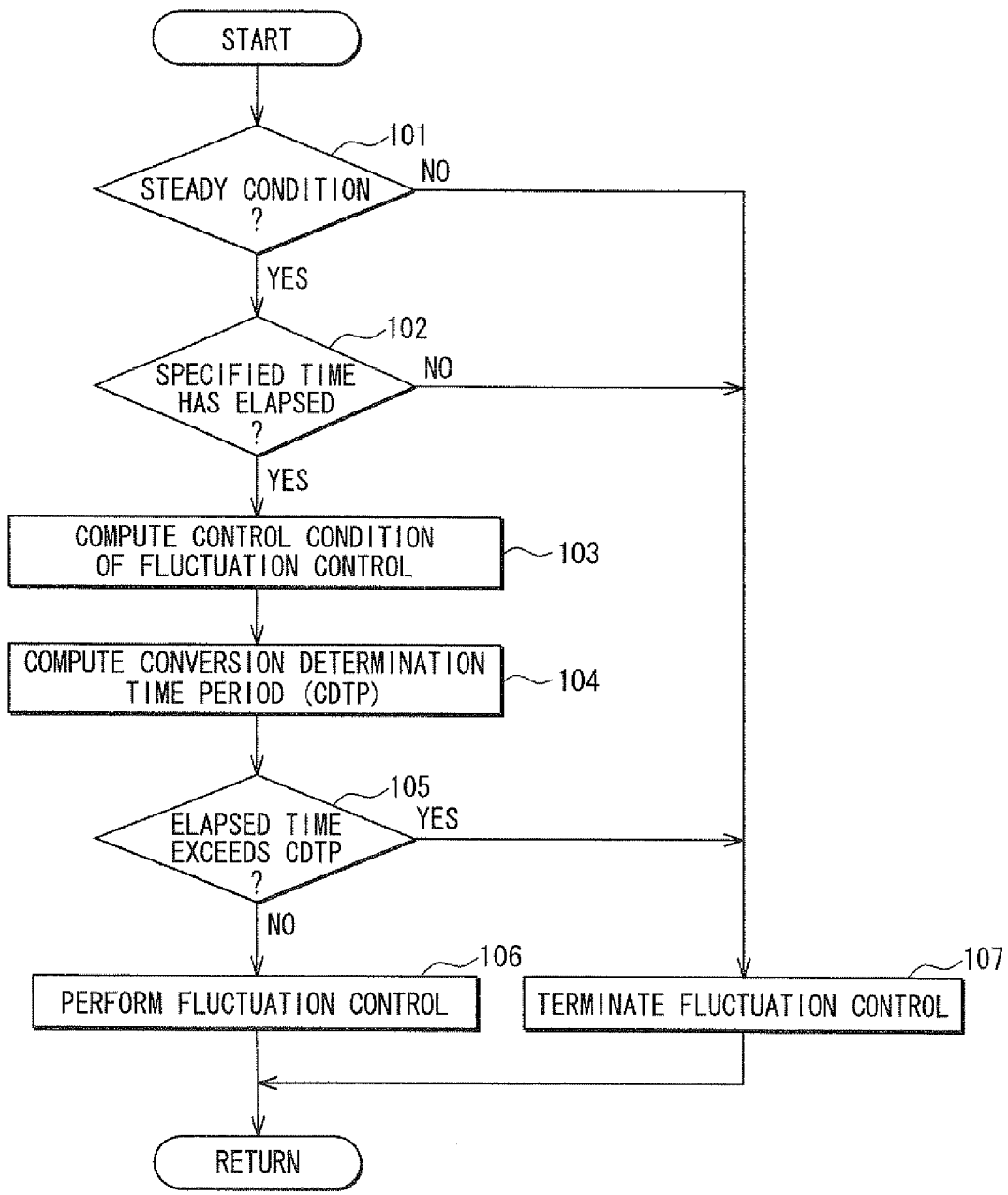
FIG. 5 is a flowchart showing a process of a fluctuation control routine.

The ECU performs a fluctuation control routine shown in FIG. 5. As shown in FIG. 3, in a fluctuation control, when the variable valve lift control apparatus 32 is in a steady condition, the target lift amount is varied in an increasing direction by a predetermined fluctuation width W during a up-time Tup (for example, 0.0082 sec), and then the target lift amount is varied in a decreasing direction by the fluctuation width W during a down-time Tdown (for example, 0.2 sec) that is longer than the up-time Tup. The target lift amount is returned to the original value and is held at the original value for a predetermined bottom-time Tbottom (for example, 0.5 sec). Such a process is periodically performed repeatedly. A total time of the up-time Tup, the down-time Tdown and the bottom time Tbottom correspond to a fluctuation cycle T of the fluctuation control. (Fluctuation cycle T=Tup+Tdown+Tbottom).

Figure 4:
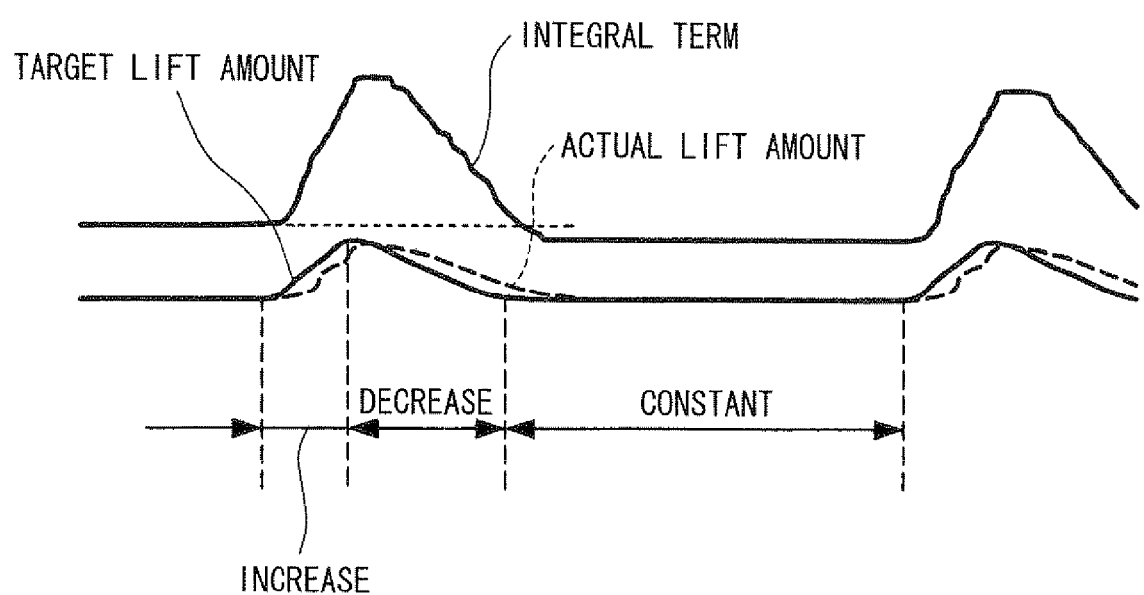
FIG. 4 is a time chart for explaining a target lift amount and a behavior of an integral term according to the fluctuation control.

As shown in FIG. 4, the target lift amount is increased by the fluctuation width W and then is decreased by the fluctuation width W to the original value, so that the integral term can be increased once and then decreased. The down-time Tdown is longer than the up-time Tup, whereby a decreasing amount of the integral term is greater than the increasing amount thereof. Consequently, the integral term can be made smaller than the original value. By periodically performing the above process repeatedly, while the target lift amount is increased and decreased around the original value, the integral term is gradually decreased.

Therefore, even when the variable valve lift control apparatus 32 is in the steady condition and the control duty is the larger value due to the hysteresis, the fluctuation control gradually decreases the increment of the integral term and converges the control duty at the smaller value.

The above fluctuation control is executed by performing the fluctuation control routine shown in FIG. 5.

The fluctuation control routine shown in FIG. 5 is executed at a specified time interval while the ECU 30 is energized. This routine functions as a fluctuation control means. In step

101, the computer determines whether the variable valve lift control apparatus is in a steady condition. For example, it is determined according to the following conditions.

(1) The target lift amount is almost constant. (For example, the absolute value of a difference between a previous target lift amount and a current target lift amount is less than a specified value.)

(2) The actual lift amount is almost constant. (For example, the absolute value of a difference between a previous actual lift amount and a current actual lift amount is less than a specified value.)

(3) The absolute value of difference between the target lift amount and the actual lift amount is less than a specified value.

When the above three conditions (1)-(3) are satisfied, the computer determines that the variable valve lift control apparatus 32 is in the steady condition. If at least one of the conditions is not satisfied, the computer determines that the variable valve lift control apparatus 32 is not in the steady condition. When the answer is No in step 101, the procedure proceeds to step 107 in which the fluctuation control is terminated to end the routine.

When the answer is Yes in step 101, the procedure proceeds to step 102 in which the computer determines whether a specified time has elapsed after the computer determined that the variable valve lift control apparatus is in the steady condition. When the answer is Yes in step 102, the procedure proceeds to step 103.

In step 103, control conditions of the fluctuation control, such as the fluctuation width W, the fluctuation cycle T, the up-time Tup, and the down-time Tdown, are computed according to at least one of oil temperature, coolant temperature, engine speed, engine load, and ambient temperature by use of maps or formulas.

Generally, the frictional force of a moving element of the variable valve lift control apparatus 32 and a reaction force acting on the variable valve lift control apparatus 32 will change according to the engine temperature, the ambient temperature, or the engine operation conditions. The hysteresis characteristic also changes, whereby the increment of the integral term due to the hysteresis characteristic also changes.

In consideration of such a situation, the maps or the formulas of each control condition of the fluctuation control are previously prepared based on test data, the design data, and the like. Each control condition of the fluctuation control is varied according to the engine temperature (oil temperature, coolant temperature), the ambient temperature, and engine driving condition (engine speed, engine load). Each control condition of the fluctuation control is changed to appropriate values in accordance with the variation in increment of the integral term. The fluctuation width W is established in such a manner as to be within a permissible variation range of the lift amount in the steady condition.

Then, the procedure proceeds to step 104 in which a conversion determination time period (CDTP) is computed based on at least one of the control conditions (the fluctuation width W, the fluctuation cycle T, the up-time Tup, the down-time Tdown) by use of maps or formulas. The CDTP is established as a period which is necessary until the integral term converges to a lower limit value from a time of starting the fluctuation control. The lower limit is a value which is necessary for the variable valve lift control apparatus 32 to be maintained in the steady condition.

The maps and formulas for computing the CDTP are previously formed based on the test data and the design data in such a manner that the CDTP varies to a proper value in accordance with the time period required for the integral value to converge to the lower limit.

Then, the procedure proceeds to step 105 in which the computer determines whether the elapsed time after starting of the fluctuation control exceeds the CDTP. When the answer is No in step 105, the procedure proceeds to step 106 in which the fluctuation control is performed under the control conditions which are established in step 103. In the fluctuation control, the target lift amount is varied in an increasing direction by the fluctuation width W during the up-time Tup, and then the target lift amount is varied in a decreasing direction by the fluctuation width W during the down-time Tdown. The target lift amount is returned to the original value and is held at the original value for the bottom-time Tbottom. Such a process is periodically performed repeatedly. The target lift amount is increased and decreased around the original value, so that the integral term can be gradually decreased.

When the answer is Yes in step 105, the computer determines that the control duty has converged to the small value and the procedure proceeds to step 107 in which the fluctuation control is terminated. The processes in steps 104 and 105 correspond to converge determination means.

According to the embodiment described above, the target lift amount is increased and decreased by the fluctuation width W, and then returned to the original value by performing the fluctuation control. Hence, even when the control duty is the large value due to the hysteresis characteristic, the increment in the integral term is gradually decreased to be converged to the lower limit, so that the control duty is converged to the small value. The energy consumption can be reduced when the variable valve lift control apparatus is in the steady condition.

Figure 6:
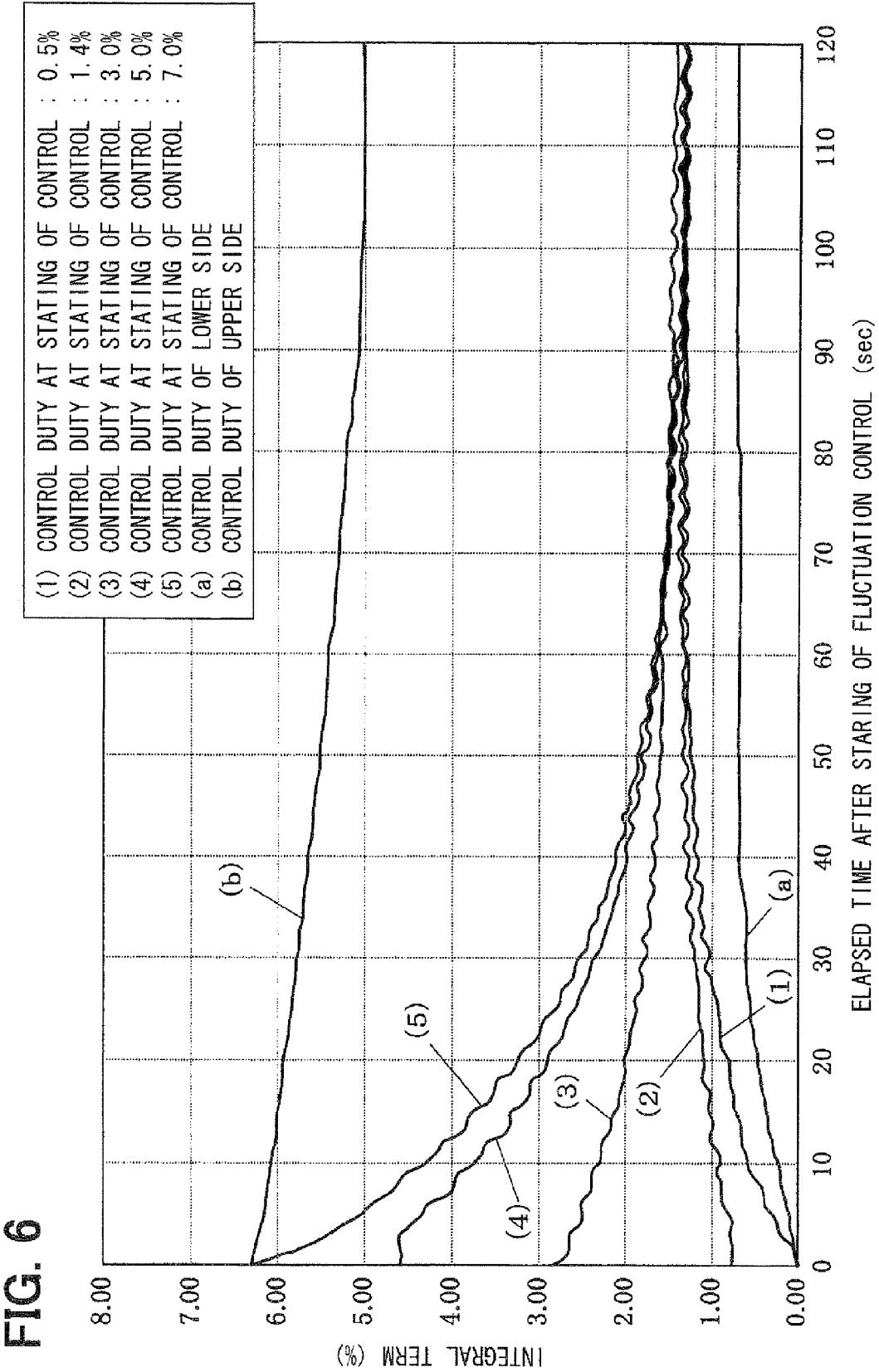
FIG. 6 is a time chart showing a behavior of an integral term after the fluctuation control is started.

Furthermore, as shown in FIG. 6, without respect to the integral term value at starting of the fluctuation control, the integral term can be converged to the lower limit, whereby the control duty is converged to the small value (control duty at lower side of the hysteresis).

Since the valve lift amount can be appropriately increased and decreased by the fluctuation control, it can be avoided that the motor and the gear of the variable valve lift control apparatus 32 continuously engages at the same portion, whereby uneven abrasion at an engaging portion between the motor and the gear can be restricted. Furthermore, since the control duty can be converged to the small value where the energy consumption is small, magnetic noise generated by an actuator, such as a DC motor, of the variable valve lift control apparatus 32 can be reduced.

In the present embodiment, each control condition (the fluctuation width W, the fluctuation cycle T, the up-time Tup, the down-time Tdown) of the fluctuation control is varied according to the engine temperature (oil temperature, coolant temperature), the ambient temperature, and engine driving condition (engine speed, engine load). Each control condition of the fluctuation control can be changed to appropriate value in accordance with the variation in increment of the integral term. The increment in the integral term can be promptly decreased by the fluctuation control.

Alternatively, at least one of the control conditions can be previously fixed to simplify the computation.

Moreover, in the present embodiment, when the elapsed time after stating the fluctuation control exceeds the CDTP, the computer determines that the control duty has converged to the small value and the fluctuation control is terminated. Hence, the execution period of the fluctuation control can be restricted as short as possible, and the variable valve lift control apparatus 32 can be returned to the ordinary condition (steady condition in which no fluctuation control is performed).

Furthermore, in the present embodiment, since the conversion determination time period (CDTP) is varied in accordance with the control conditions (the fluctuation width W, the fluctuation cycle T, the up-time Tup, the down-time Tdown), the CDTP can be set at a proper value according to the variation in time which is required for the integral term to converge to the lower limit. Thus, the accuracy of the conversion determination can be improved. Alternatively, the CDTP can be previously fixed to simplify the computation.

The way of determining whether the integral term converges to the lower limit can be suitably changed. For example, it can be determined whether the integral term has converged to the lower limit based on a behavior of the integral term (changing speed, changing amount and the like).

The fluctuation control of the present invention can be applied to a variable valve lift control apparatus which adjust the lift amount of an exhaust valve. Furthermore, the fluctuation control can be applied to a variable valve control apparatus which adjusts valve timing and working angle of the intake valve and the exhaust valve.

The fluctuation control of the present invention can be applied to another apparatus which is used for an engine control, such as an electronic throttle controller and an EGR controller. The fluctuation control can be applied to various systems in which the control input of the control object is controlled by a feedback control (PI control or PDI control) including an integral term in order that the control output agrees with the target value.

In the fluctuation control, the target value of the control amount may be decreased once and then increased to return to the original value in a case that the energy consumption is decreased as the control amount is increased.

What is claimed is:

1. A control apparatus which controls a control input of a control object in such a manner that a control output of the control object agrees with a target value by a control using at least an integral term, the control apparatus comprising:
   a determination means for determining whether the control object is in a steady condition; and
   a fluctuation control means for periodically repeatedly performing a fluctuation control, when the control object is in the steady condition, in which the target value is varied in a specified direction by a specified width during a first time period and then the target value is varied in a reverse direction relative to the specified direction by the specified width during a second time period which is longer than the first time period to be returned to an original value.

2. A control apparatus according to claim 1, wherein
the control object is a device used for controlling an internal combustion engine, and
the fluctuation control means varies a control condition according to at least one of an oil temperature, a coolant temperature, an engine speed, an engine load and an ambient temperature.

3. A control apparatus according to claim 1, further comprising
a conversion determination means for determining whether the integral term is converged to a lower limit while the fluctuation control is performed, wherein
the fluctuation control means terminates the fluctuation control when the conversion determination means determines that the integral term is converged to the lower limit.

4. A control apparatus according to claim 3, wherein
the conversion determination means determines that the integral term is converged to the lower limit when an elapsed time after stating of the fluctuation control exceeds a specified conversion determination time period.

5. A control apparatus according to claim 4, wherein
the conversion determination means varies the conversion determination time period according to the control condition of the fluctuation control.

6. A control apparatus according to claim 1, wherein
the control object is a variable valve control apparatus which adjusts a valve characteristic of an intake valve and/or an exhaust valve of an internal combustion engine.

* * * * *